United States Patent [19]

Gyugyi et al.

[11] 4,348,631
[45] Sep. 7, 1982

[54] STATIC VAR GENERATOR

[75] Inventors: Laszlo Gyugyi, Penn Hills; Peter Wood, Murrysville, both of Pa.

[73] Assignee: Westinghouse Electric Corp., Pittsburgh, Pa.

[21] Appl. No.: 270,470

[22] Filed: Jun. 4, 1981

[51] Int. Cl.³ .............................................. H02J 3/18
[52] U.S. Cl. ................................................. 323/211
[58] Field of Search ............................... 323/210, 211

[56] References Cited

U.S. PATENT DOCUMENTS 3,703,680 11/1972 Frank et al. ......................... 323/210
4,047,097 9/1977 Gyugyi et al. ...................... 323/211
4,234,842 11/1980 Brennen et al. ..................... 323/210
4,234,843 11/1980 Gyugyi et al. ...................... 323/210

Primary Examiner—William M. Shoop
Attorney, Agent, or Firm—Benjamin Hudson, Jr.

[57] ABSTRACT

This invention discloses a novel means of inserting capacitance into an AC network for power factor correction or voltage regulation that minimizes and transient disturbances to the system. Current surges and voltage transients that are normally associated with connection of capacitors into an AC network is minimized by predetermining an amount of inductance that must be inserted to suppress these transients and simultaneously inserting the inductance into the network with the capacitance.

1 Claim, 7 Drawing Figures

STATIC VAR GENERATOR

BACKGROUND OF THE INVENTION

1. Field of the Invention

This invention relates generally to static VAR generators, and more particularly to static VAR generators employing switched capacitors in conjunction with switched inductors for regulating an AC network.

2. Description of the Prior Art

The switching of capacitors into an AC network for power factor correction or voltage control must be accomplished with a minimum of disturbance to the system. To minimize high voltage disturbances on the AC network the capacitors must be switched to and from the system at current zero when the system voltage is at its positive or negative peak. Once the capacitors have been disconnected from the system they gradually discharge over a period of time. To maintain peak voltage on the capacitors they must be periodically switched back into the system. Recharging of the capacitors results in current surges and voltage transients in the AC network. In addition, maintaining the capacitor banks at full voltage subjects them to DC stress and requires more expensive DC-type capacitors. It has been proposed in the U.S. Pat. No. 3,703,680 issued to Frank et al. to switch the capacitor banks into the system for reversing the charge every half period in synchronism with the maximum of the network voltage. Since the charge on the capacitor banks can alternate with the network voltage it is proposed that the capacitor banks can be maintained at peak voltage without subjecting them to DC stress and, consequently, AC capacitors can be used. However, charging current surges and thus voltage transients in the network remain a problem.

It is desirable when regulating an AC network to be capable of responding to the needs of the system as quickly as possible. Because capacitors must be switched into the system when the system current is zero and the system voltage is either positive or negative, power system engineers would like to manage their system so that when the system demands capacitors they are available of both polarities to be switched in at the very next current zero crossover. Otherwise, if the system demands increased capacitance and if at the next current zero crossover the system voltage is positive and the capacitors are all negative charged, or vice versa, the system would have to wait another half cycle until the system voltage matches the capacitor voltage. To eliminate this problem, it would be desirable to have the capability to reverse the charge on capacitors when it is found that all the capacitors in the bank have the same polarity. However, engineers are reluctant to insert capacitors into the system for charge reversal due to the transient disturbances to the system that can result. It would be advantageous to those skilled in the art if there could be found a means of switching in capacitance without the effect of creating disturbances in the system. See also, U.S. Pat. No. 4,234,843 issued to L. Gyugyi which utilizes inductance with capacitance switching.

SUMMARY OF THE INVENTION

There is provided by this invention a means of switching capacitor banks into an AC network and greatly minimizing current surges and thus voltage transients in the system. This novel capacitance switching means comprises a method of determining an amount of inductance that is switched into the network in parallel and simultaneously with the capacitor bank to suppress recharging current surges in the system.

DESCRIPTION OF THE PREFERRED EMBODIMENT

Figure 1:
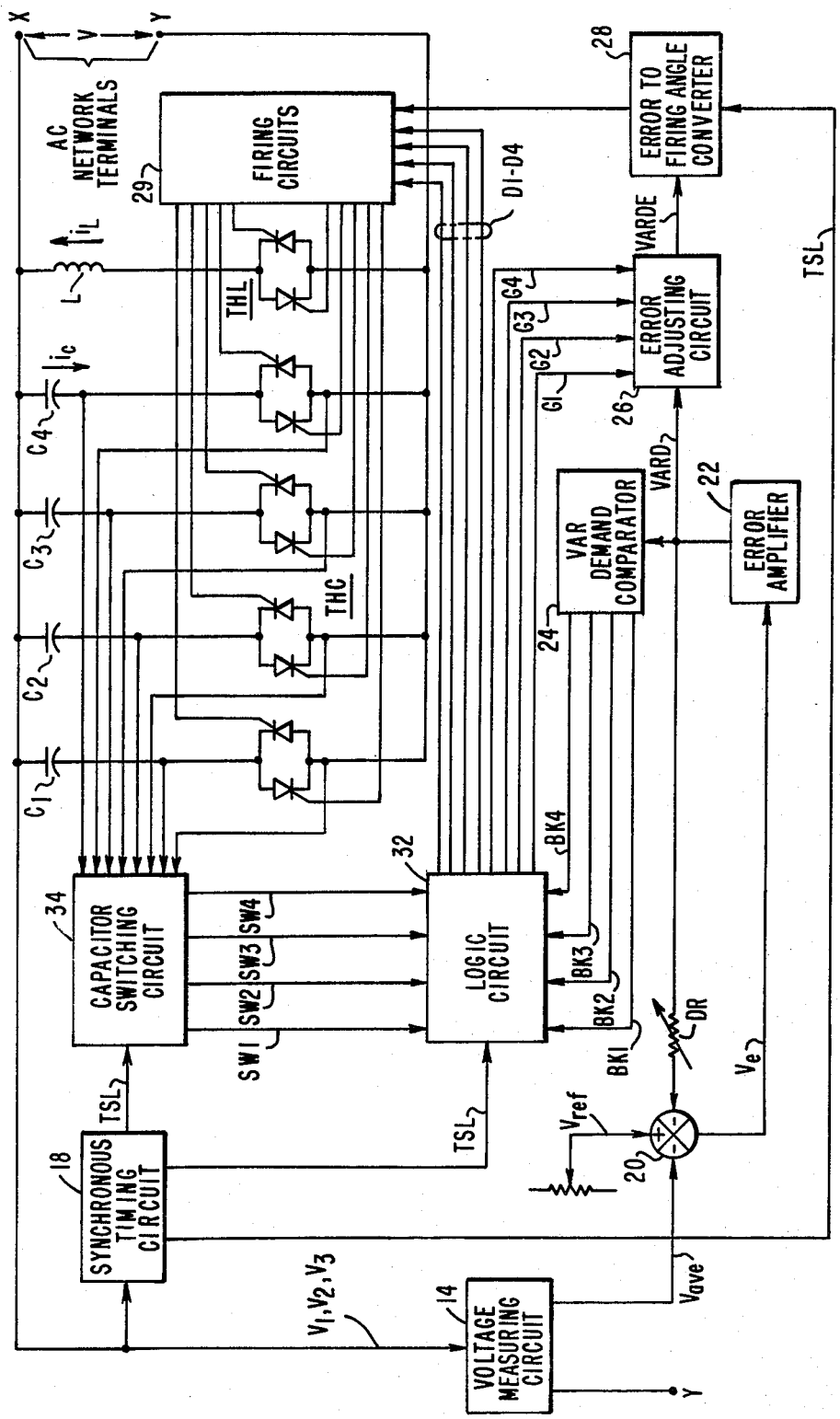
FIG. 1 illustrates a VAR generator and control system incorporating the principles of this invention.

Referring to FIG. 1 there is shown one phase of a three-phase AC network comprising two conductors X and Y. Capacitors $C_1$ through $C_4$ are connected in parallel across conductors X and Y by means of anti-parallel connected thyristor branches THC. Inductor L is also connected across conductors X and Y in parallel with $C_1$ through $C_4$ by means of anti-parallel connected thyristor branch THL. The inductor L is sized to provide reactive power to offset any excessive capacitance switched in above the VAR demand requirements in addition to providing reactive power to suppress any current surge as a result of switching in any capacitor bank.

The network voltage across the conductors X and Y is measured and the three-phase average value $V_{ave}$ is determined by the voltage measuring circuit 14. This circuit may use conventional techniques to measure the three-phase average, single-phase average, single-phase rms, etc., values of the AC network. An error generator 20 compares the measured $V_{ave}$ to a reference voltage $V_{ref}$. The difference between $V_{ref}$ and $V_{ave}$ is the error signal $V_e$ which is fed to an error amplifier 22. The gain of the error amplifier 22 is adjusted by a droop setting potentiometer DR so that the total capacitor VAR output is provided for some allowed or specified droop of the AC network voltage. The error amplifier 22 may be a conventional small signal DC amplifier with appropriate frequency characteristics to provide the response time and stability required. The amplified error signal VARD is thus proportional to the reactive power required to compensate the network so as to keep its voltage variation within specified limits. This amplified error signal or VAR demand signal VARD is fed to the VAR demand comparator 24 which determines the number of capacitor banks to be switched in to provide the capacitive VAR's for compensation to the AC network. The VAR demand comparator 24 is an n-level comparator (where n indicates the number of capacitor banks in each phase of the VAR generator) determining the VAR demand points at which an additional capacitor bank has to be switched in or out of the system.

Logic signals BK1 through BK4 from the VAR demand comparator 24 representing the required status (in or out) of the corresponding capacitor banks are fed to the logic circuit 32 for capacitor switching. The logic circuit 32 selects the capacitor bank whose charge voltage equals the system voltage when the system current next passes through zero. A synchronous timing circuit 18 works in cooperation with a capacitor switching circuit 34 for timing the addition or subtraction of capacitors from the AC network. The synchronous timing circuit 18 primarily provides proper timing waves to ensure that the thyristor controlled reactances are operated in synchronism with the AC network voltages. The synchronous timing circuit may be made similar to that described in U.S. Pat. No. 3,999,117, entitled "Method And Control Apparatus For Static VAR Generator And Compensator" issued to L. Gyugyi and M. B. Brennen.

Figure 2A:
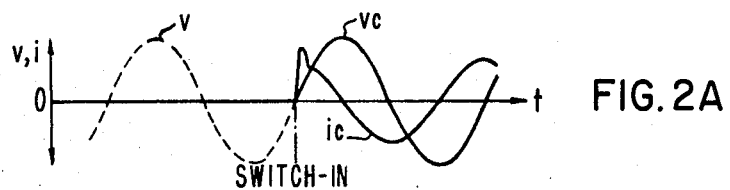
FIGS. 2A–2E illustrate plots of line voltage, capacitor voltage, and current versus time for switching conditions of the system of FIG. 1.
Figure 2B:
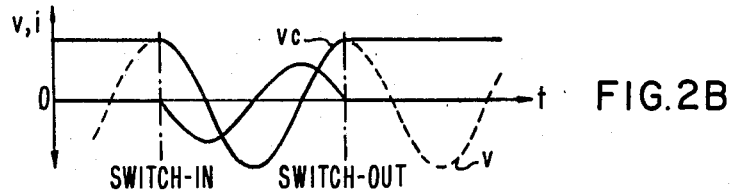
Figure 2C:
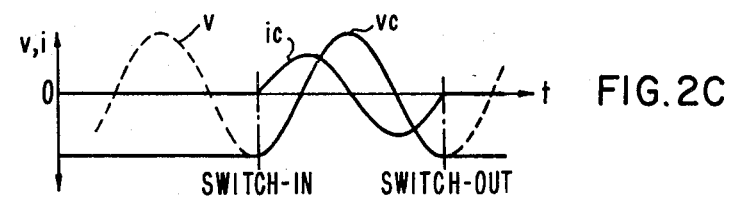
Figure 2D:
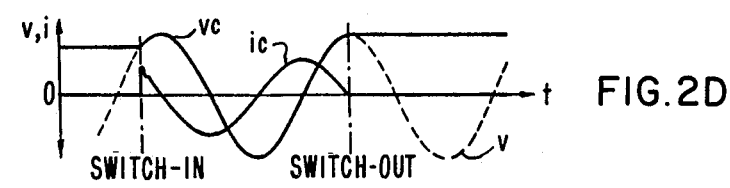
Figure 2E:
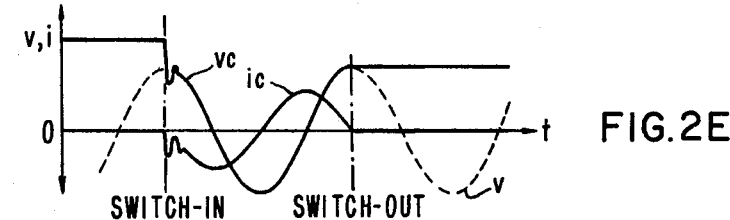

The capacitor switching circuit 34 monitors the voltage across the solid-state capacitor switches THC and gives a logic signal out when this voltage is low enough to provide transient-free switching of a capacitor bank. The voltage across the solid-state switch THC is the difference between the capacitor voltage and the AC network voltage. Theoretically, the correct instant of time to switch-in a capacitor bank is when the voltage across the solid-state switch is zero, that is, the AC network voltage equals the capacitor voltage. FIGS. 2A through 2E illustrate different switching conditions and their effect on the AC network. FIG. 2A illustrates the condition when a capacitor bank is switched in and the capacitor charge voltage is zero as may be the case under start-up conditions. Notice the high current surge at the instant of switching in. This results in voltage transients to the AC network. FIGS. 2B and 2C illustrate theoretical switching conditions when the capacitor charge voltage equals the AC network voltage. Notice the absence of the current surges when the capacitors are switched in or out. FIG. 2D illustrates the condition of switching in a discharging capacitor. Again notice the current surge at the instant of switching in. FIG. 2E illustrates the conditions of switching in an overcharged capacitor. It can thus readily be seen that high current surges result when capacitors are switched in at instants when the capacitor voltages does not equal the AC network voltage.

Figure 3:
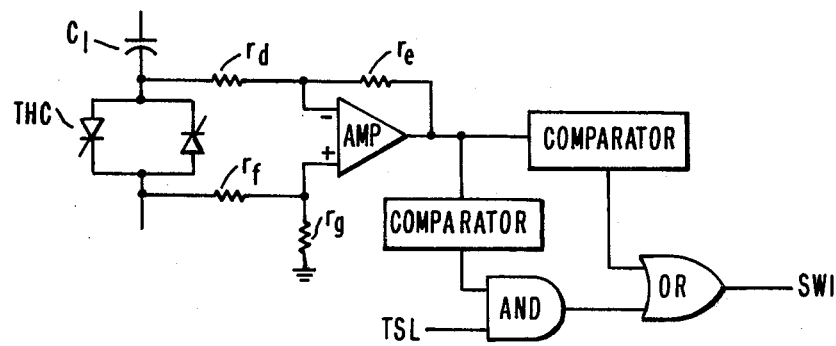
FIG. 3 illustrates a block diagram for the capacitor switching circuit.

FIG. 3 illustrates a possible realization of a capacitor switching circuit 34 which allows capacitor switching at a time when the capacitor voltage is in the closest synchronism with the system voltage signal TSL supplied by the synchronous timing circuit 18. The capacitor switching circuit 34 consists of a differential amplifier and two comparators, one at which is AND gated with the timing signal TSL, obtained from the synchronous timing circuit 18.

In addition to the aforementioned signals BK1 through BK4 fed to the logic circuit 32 shown in FIG. 1, outputs SW1 through SW4 of the capacitor switching circuit 34 which define the time instants at which the capacitor banks can be switched with a minimum of disturbance to the network are also inputted to logic circuit 32 along with a timing signal $V_{TSL}$ from the synchronous timing circuit 18. The logic circuit 32 determines on the basis of information received from the VAR demand comparator 24, the capacitor switching circuit 34, and the synchronous timing circuit 18 which capacitor banks should be switched in or out to provide the VAR demand without causing appreciable network transients. Once the capacitor bank selection is made, the logic circuit provides logic drive signals D1 through D4 to the firing circuit 29 which in turn fires the appropriate thyristors switching the capacitor banks selected.

The logic circuit 32 also provides logic drive signals G1 through G4 to the error adjusting circuit 26 indicating which capacitor banks are switched. The error adjusting circuit 26 compares the capacitor firing signals from the logic circuit 32 with the VAR demand signal from the error amplifier 22 and outputs a VAR demand error signal VARDE to an error to firing angle converter 28. The VAR demand error signal VARDE compensates for any error in the capacitance level that may have been switched, in addition to correcting for any capacitance charging current surges by sending output signal EFA to the firing circuits 29 to switch in a compensating inductance which effectively offsets excessive capacitance currents created. An input from the synchronous timing circuit 18 to the error to firing angle converter 28 synchronizes the firing of the inductance into the system with the capacitor banks. The error-to-firing angle converter may be of the type described in the aforementioned U.S. Pat. No. 3,999,117.

It can readily be seen that there is provided by this invention a novel static VAR generator that minimizes capacitor charging current surges and thus voltage transients to an AC network by predetermining the amount of inductance that must be simultaneously switched with a discrete capacitance level to suppress current surges and voltage transients to the network. This invention is unique from other static var generator designs because the feature of predetermining the amount of compensating inductance that would be needed for surge suppression and switching the required capacitance and compensating inductance into the AC network simultaneously gives the system greater flexibility and reliability.

Although there has been illustrated and described a specific embodiment, it is clearly understood that the same were merely for purposes of illustration and that changes and modifications may readily be made therein by those skilled in the art without departing from the spirit and scope of this invention.

What we claim is:

1. A static var generator, comprising:
   (a) a reactance means disposed for connection into an AC network;
   (b) a monitoring means for monitoring the reactive requirements of said AC network;
   (c) a control means connected to said reactance means and said monitoring means for connection of said reactance means into said AC network in response to the reactive requirements of said AC network; and
   (d) an error adjusting circuit in combination with said control means disposed to predetermine an amount of capacitive surging current and connect an inductive reactance in synchronism with capacitive reactance to suppress said capacitive surging current resulting in minimizing voltage transients in said AC network.

* * * * *